United States Patent [19]

Chisum

[11] E Re. 30,914

[45] Reissued Apr. 27, 1982

[54] TRUCK FRAME ALIGNMENT APPARATUS

[76] Inventor: Finis L. Chisum, P.O. Box 1145, Claremore, Okla. 74017

[21] Appl. No.: 100,440

[22] Filed: Dec. 5, 1979

Related U.S. Patent Documents

Reissue of:

[64] Patent No.: 4,138,876
Issued: Feb. 13, 1979
Appl. No.: 710,437
Filed: Aug. 2, 1976

[51] Int. Cl.[3] ..... B21D 1/14
[52] U.S. Cl. ..... 72/457; 72/705
[58] Field of Search ..... 72/705, 457, 455; 254/90, 45, 47; 414/285

[56] References Cited

U.S. PATENT DOCUMENTS

| | | | |
|---|---|---|---|
| 1,870,991 | 8/1932 | Fitch | 254/47 |
| 2,717,020 | 9/1955 | Dobias | 72/705 X |
| 3,050,099 | 8/1962 | Smith | 72/705 X |
| 3,269,169 | 8/1966 | Latuff et al. | 72/705 X |
| 3,377,834 | 4/1968 | Latuff et al. | 72/705 X |
| 3,590,623 | 7/1968 | Hunnicutt | 72/705 X |
| 3,689,030 | 9/1972 | Backus | 72/705 X |
| 3,776,022 | 12/1973 | Lionello | 72/705 X |
| 3,888,100 | 6/1975 | Chisum | 72/705 X |
| 3,927,550 | 12/1975 | Samuelsson | 72/705 |

FOREIGN PATENT DOCUMENTS

| | | | |
|---|---|---|---|
| 249933 | 2/1964 | Australia | 72/705 |
| 2037225 | 2/1972 | Fed. Rep. of Germany | 72/705 |
| 1011759 | of 1965 | United Kingdom | 72/705 |
| 1295511 | 11/1972 | United Kingdom | 72/705 |

*Primary Examiner*—Lowell A. Larson
*Attorney, Agent, or Firm*—Head & Johnson

[57] ABSTRACT

A heavy duty truck liner for working on a truck, or large trailer, where a plurality of pulling and pushing operations are required to straighten a frame, etc. A plurality of tracks in the form of a rectangle surrounding the normal position of the truck and body, is prepared and set into the concrete floor of the work room. A large inverted U-frame is set on rollers which are adapted to travel longitudinally along the long sides of the track. The frame is large enough to completely encircle the truck and body can be moved readily along the track so as to be opposite any point on the side walls of the body where pulling or pushing operations are required. A folding platform is attached in a slidable manner to the sidewalls of the frame so as to position the platform at any level on either side of the body. Hydraulic locking means are provided to lock the frame in any selected position so as to withstand any pulling and pushing forces required. A plurality of robots are provided which are adapted to run on a second set of rails paralleling the first set which support the U-frame. Each of these robots is provided with a swivel table and a hydraulic crane so that it can be used to pick up loads, swing them to different positions and transport them along the rails, etc. The hydraulic crane can reach into the frame of the truck and pull, or push, as required, to provide straightening operations.

12 Claims, 19 Drawing Figures

TRUCK FRAME ALIGNMENT APPARATUS

Matter enclosed in heavy brackets [ ] appears in the original patent but forms no part of this reissue specification; matter printed in italics indicates the additions made by reissue.

CROSS-REFERENCE TO RELATED PATENT

This application is related to U.S. Pat. No. 3,888,100 issued June 10, 1975 entitled Auto Body and Frame Straightening Device, of Finis L. Chisum.

BACKGROUND OF THE INVENTION

This invention lies in the field of truck body liners, that is, apparatus for pushing and pulling at selected points on the frame of a truck or heavy vehicle, so as to straighten frames, and bend parts as necessary, to properly line up the truck substructure.

More particularly this invention is directed to an apparatus for electrohydraulically carrying out all of the operations necessary to rapidly set a plurality of hydraulic push/pull devices, or robots, so as to straighten a crumpled truck frame.

Reference has been made to U.S. Pat. No. 3,888,100 which describes improved apparatus for rapidly and conveniently exerting hydraulic forces on an automobile the nominal forces required to straighten an automobile frame, many simplifications can be made in the mechanism, frame, many simplifications can be made in the mechanism, whereby cables or chains can be used, to pull around rollers or sheaves as required. However, when the extremely large forces required to straighten a heavy truck frame are considered, chains cannot be used, since if they are to withstand the tremendous forces exerted, they would be inordinately heavy, and difficult to use. Consequently, there has not been a suitable apparatus shown which can handle the forces required to straighten heavy truck frames, based upon the known art of apparatus for straightening the simpler lighter frames of automobiles and other small motor vehicles.

It is therefore an important object of this invention to provide an electrohydraulically controlled apparatus for exerting very large forces on a heavy vehicle frame, so as to provide a straightening and lining of the frame.

It is another important object of this invention to provide the pushing and pulling mechanisms that exert the selected forces at selected points on the frame, in the form of small hydraulic cranes which are adapted to run along tracks, on rollers, so as to be easily positioned at the proper point along the frame of the truck, and to be directed in any selected angle by swivel means. Suitable ball bearing means are provided so as to support the crane in rotation about a vertical axis, so that it can be used for lifting heavy parts of the vehicle such as tires, wheels, etc. and moving them along the tracks or swinging them laterally away from the vehicle.

It is a still further object to provide means by which the ball bearing means which is used to swivel the crane, to provide freedom of operation so long as the load on the crane is within the load limits of the bearing, and then to protect the bearings by exerting additional restraint means exterior of the bearing when the load is greater than the load capability of the bearing.

SUMMARY OF THE INVENTION

These and other objects are realized and the limitations of the prior art are overcome in this invention by providing a plurality of tracks locked into the concrete floor of a workroom, where trucks can be driven onto the floor, and be surrounded by the tracks. An inverted U framework encircles the body of the truck and can run on wheels the length of the tracks, corresponding to the length of the body of the truck or trailer. Additional tracks are also provided on which are run a plurality of robot devices, each of which can be run freely on rollers or locked to the track. Each of the robots has a ball bearing supported rotatable table on which is mounted a hydraulic crane which can push or pull horizontally, which can lift or lower vertically and which can tilt a work tool through a selected angle at the end of the operating arm.

Each of these robot vehicles can be used as a movable crane up to a certain load limit, which is the maximum that can be supported by the ball bearing which supports the table. Thus, the robot can lift, transport, and rotate with a load of a selected maximum value. When pushing or pulling against the frame, the hydraulic forces generated by the crane may well exceed the load limit of the ball bearing that supports the rotating table. Spring washer means are provided for releasing the ball bearing from the table and providing other means to restrain the movement of the table, to carry loads in excess of that which can be carried by the ball bearing.

With a plurality of these robot devices, which can be positioned at selected points around the truck frame, it is possible to push and pull at a plurality of points in order to quickly and simply line up a frame of a heavy truck vehicle.

BRIEF DESCRIPTION OF THE DRAWINGS

These and other objects and advantages of this invention and a better understanding of the principals and details of the invention will be evident from the following description taken in conjunction with the appended drawings in which.

DESCRIPTION OF THE PREFERRED EMBODIMENT

Before explaining the present invention in detail, it is to be understood that the invention is not to be limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description, and not of limitation.

Figure 1:
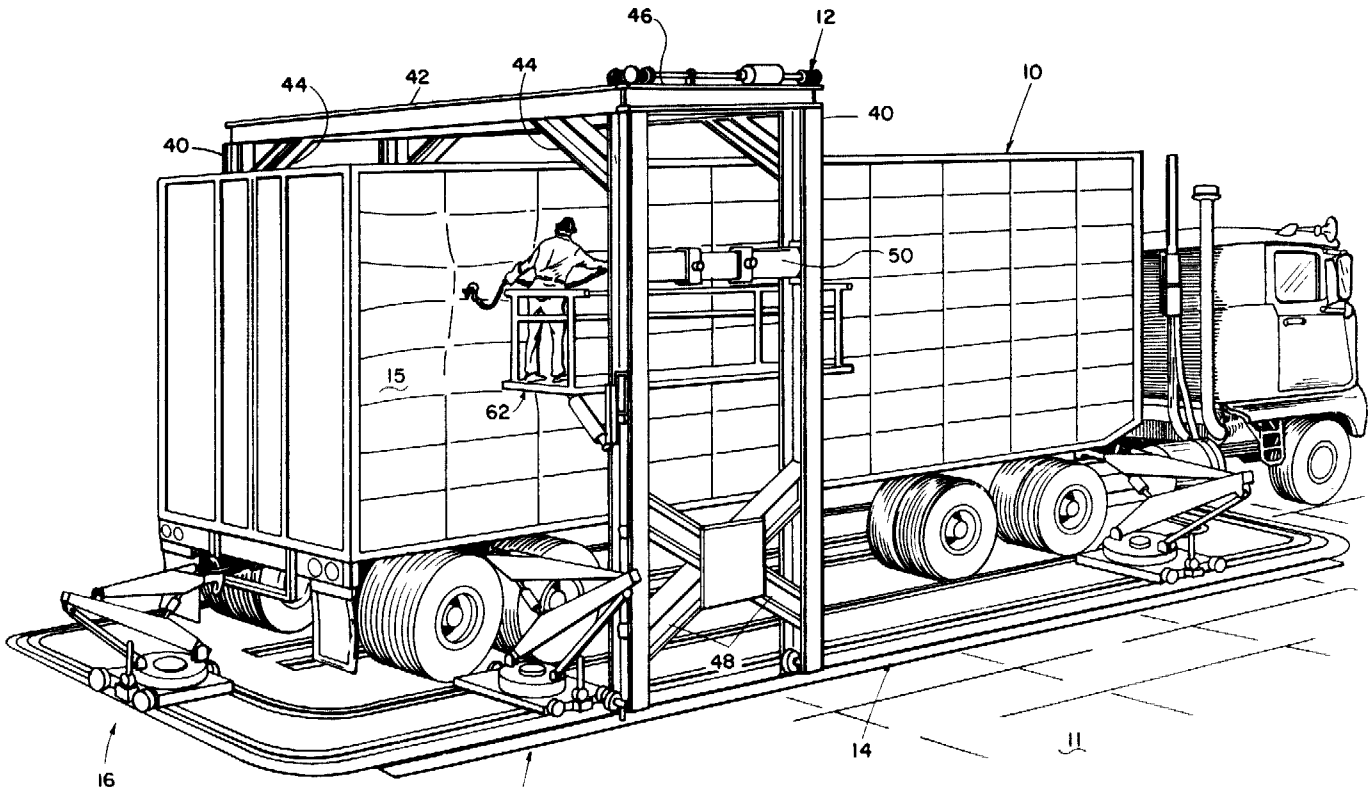
FIG. 1 represents a perspective view of a large truck and body and the apparatus of this invention as it would be used to straighten and line up the frame of such a vehicle.

Referring now to the drawings and in particular to FIG. 1, there is shown an overall schematic drawing of a large truck and body 10 standing on a portion of the floor 11 of a work room. There are a plurality of parallel spaced tracks 14 in the floor, which are tied together by welding and cross bracing, and locked into the concrete slab, so that when a hydraulic mechanism is clamped to the track, the frame can support a pull greater than that which can be exerted by the hydraulic mechanism.

There are two sets of tracks. One of these extends in the form of two parallel tracks, one on each side of the space to be occupied by the truck and body. An inverted U framework is composed of steel columns and cross bars, with angle brackets and gussets, to stiffen and support the framework. The inverted U frame runs on rollers attached to the bottom ends of the frame. Means are provided to clamp the U frame to the track, after it has been positioned at the proper point so that forces can be applied to the body of the truck.

A plurality of robot devices 16 or movable hydraulic cranes, are shown which are supported on a second set of tracks, which completely encircle the truck so that forces can be applied to the truck frame at any point, and can pull in any direction.

The truck and body are indicated generally by the numeral 10. The U frame is indicated generally by the numeral 12 and comprises a plurality of upright columns 40, with transverse beams 46 and 42, with appropriate angle brackets and cross bracing 44 and 48, as required, to provide the rigidity needed for the job. No great detail is provided for the construction of this frame since its only purpose is to provide a movable support for a plurality of hydraulic pulling or pushing mechanisms 50, which can be positioned in a vertical position at any selected height, and of course, in a longitudinal position, by moving the frame itself along the tracks.

A folding work table indicated generally by the numeral 62 is provided on the inside of each of the side legs of the U, so that a workman can be supported at any selected height along the side of the truck at any position, so as to attach cables or hooks or other pushing or pulling devices as required.

Figure 2:
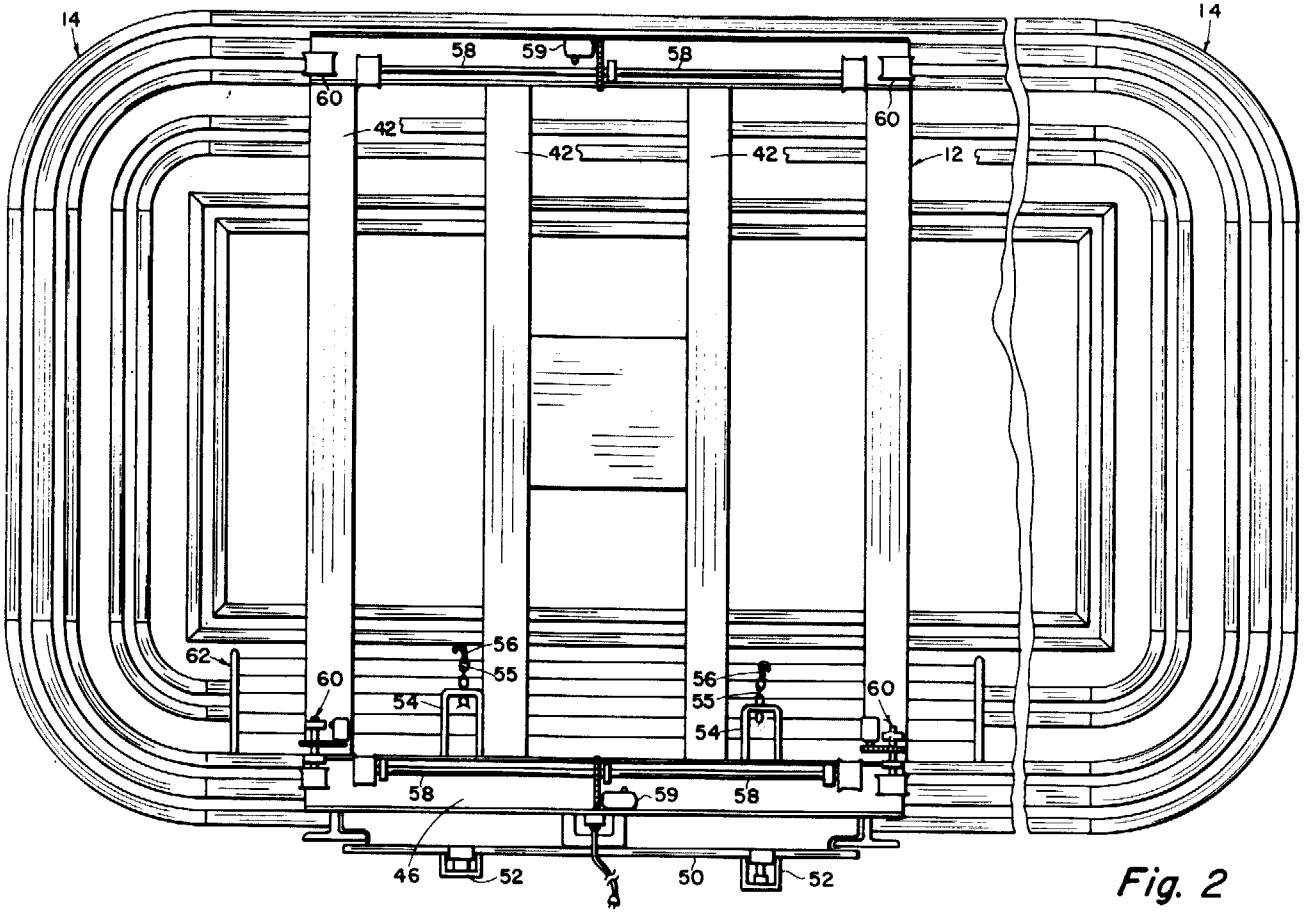
FIG. 2 illustrates in plan view the total structure of the invention.

Referring now to FIG. 2, there is shown in schematic form a plan view of the track system 14 and the U-frame 12. One set of tracks form longitudinal rails along the side of the space in which the truck is positioned and serve to guide and support the U-frame. Means are provided to clamp each of the corners of the U-frame to the rails which are supported by heavy steel structure under the floor, so that when the U frame is clamped to the rail, by hydraulic or manual means, the U-frame can be used as a base from which forces can be exerted, pushing or pulling against the body, or super structure of the truck.

Shown in FIG. 2 is the platform indicated generally by the numeral 62, the hydraulic control panel or frame 50 which supports hydraulic devices 52 and chains 55, hooks 56, etc. for exerting pulling or pushing forces against the super structure. Conventional means are provided for raising and lowering the platform 62 by means 60, such as motors and cable drums, etc. Also means are provided such as 58 and 59 for raising or lowering the support means 50 for the hydraulic devices 52, so that they can be positioned at any elevation alongside the truck, as necessary.

No great detail is shown of the frame, the manner of guiding and sliding the platform 62, and the hydraulic frame 50, and for raising and lowering these devices, since the particular details form no part of the invention. The U-frame can be built in many different configurations without interfering with the basic operation and principal of the invention.

Figure 3:
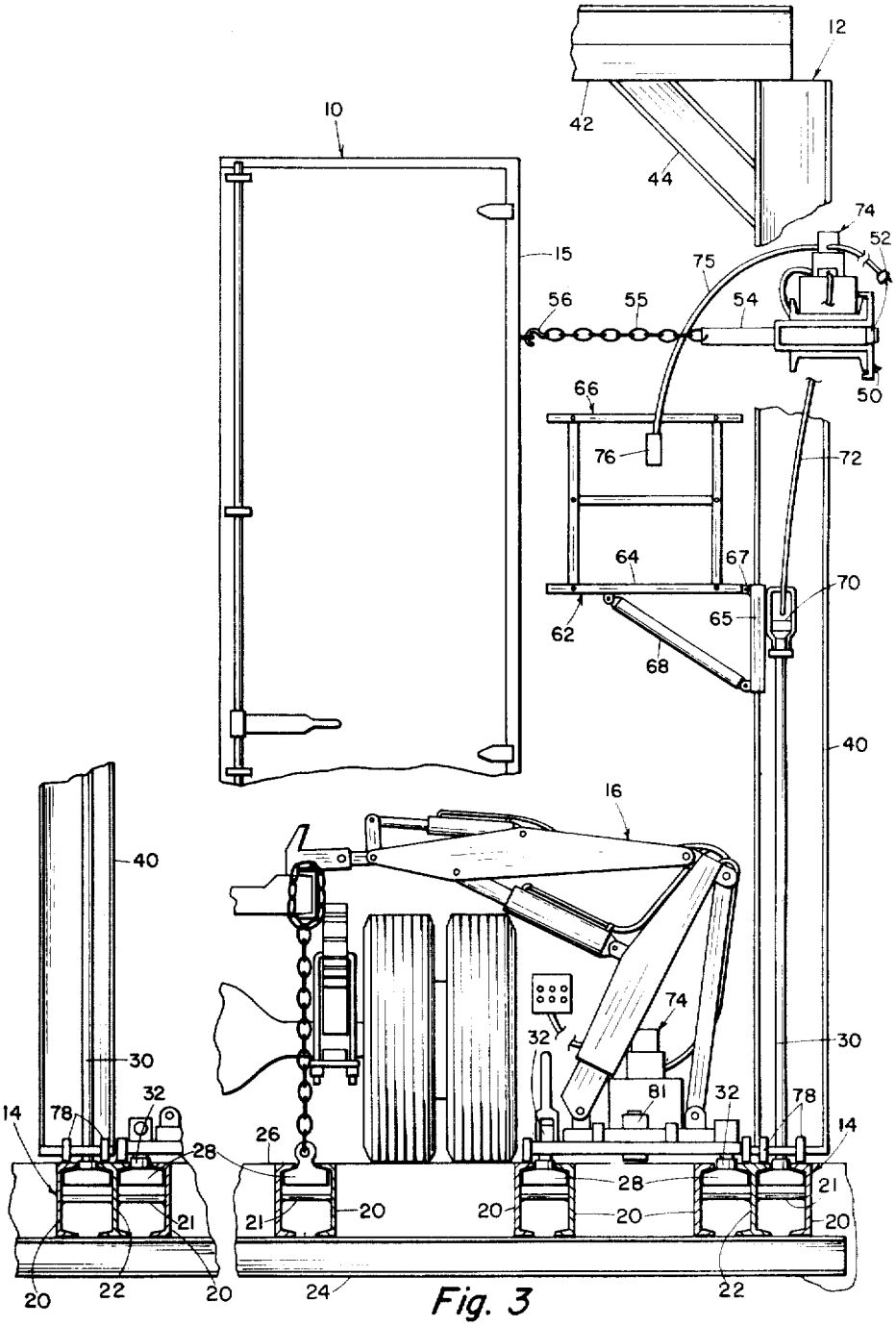
FIG. 3 illustrates in partial detail the inverted U-frame which surrounds the truck and body and runs along parallel rails and additional details of the robot device operating on the frame of the truck.

Referring now to FIG. 3, there is shown additional detail of the U-frame, and its manner of support on the tracks. Shown are portions of the support columns 40, and the cross beams 42 with angle supports 44, and so on. Shown also is the platform indicated generally by the numeral 62, which has a rectangular base 64 and a framework railing indicated generally by the numeral 66. The framework 66 is formed of parallelograms, and the platform 62 is hinged at points 67, to a frame 65 which is adapted to slide up and down on the column 40. A hydraulic cylinder and piston 68 is adapted to lift the frame when hydraulic pressure is applied to the cylinder. By tilting upwardly, the floor 64, the rails 66 will fold up and the floor and the rail will lie along the inside wall of the U-frame, supported by the columns 40.

Whenever a truck is to be brought into the work space, the platform 62 is lifted out of the way by extending the cylinder and piston 68. After the truck is in position, then the platform can be lowered into operating position as indicated in FIG. 3. The frame 65 which slides along the column is lifted by the hoisting mechanism 60 shown in FIG. 2, as is well known, by a man skilled in the art. Electrical controls 76 are connected by cable to the mechanisms 60 and 58, for raising and lowering the platform, and raising and lowering the hydraulic control panel or frame 50, which is shown in FIGS. 2 and 3. The hydraulic control panel 50 is supported slidably by the U-frame in a manner similar to that of the platform 62.

Supported on the hydraulic control panel 50 is a cylinder 52 with a piston 54 to which can be attached a chain 55 and hook 56, so as to exert a pull of selected magnitude against the wall of the super structure of the truck. If desired, a tubular extension of the piston 54 can be slipped over the piston, and can be used to push against the wall of the body of the truck indicated generally by the numeral 10, and having a side face 15, against which work is to be done.

In the bottom of FIG. 3 is shown a plurality of steel channels 20 and I beams which are spaced apart a selected distance, and are attached, as by welding, to transverse beams 24. There may be internal braces 21 additionally welded between the channels, so that the channels will form a rigid system of tracks that are deeply embedded in the concrete floor and against which pulls of large magnitude may be made against portions of the truck frame. In general, the tracks have a clear spacing between them so that a properly shaped clamping plate 28 can be suspended inside of the tracks so that it will resist and transmit to the floor any pull that may be exerted by means of the rods 30, for example or 32.

At the base of the columns 40, there are a plurality of wheels or rollers 78, which run along the surface 26 of the tracks which are flush with the floor. The wheels are guided by the rods 32, which pass through the slots. When it is desired to lock the position of the U-frame, a hydraulic cylinder 70, as shown on the right column 40 exerts an upward pull on the rod 30 which pulls the clamping plate 28 up tight against the channel 20, and pulls the column down into contact with the top of the track.

Many different ways can be provided for locking the U-frame to the track by hydraulic means. The method used in connection with the robots, indicated generally by the numeral 16, will be described in great detail in succeeding drawings and the same type of mechanism can be used to clamp the U-frame to the tracks. The point is, that when there is no pulling load on the U-frame, it should rise freely on the rollers, and when it is desired to lock the U-frame to the track, the pull of the rod 30 should be greater than certain springs that support the rollers, so that the bottoms of the columns then press directly on the tracks, while the wheels are lifted a small amount. Thus, there is rigid, metal-to-metal contact, and there can be no sliding of the U-frame along the track. This type of mechanism will be described in great detail in connection with succeeding figures.

In FIG. 3, indicated generally by the numerals 16, is a robot device, or a type of hydraulic crane, which can run freely along tracks, or can be clamped rigidly to a track and can exert tremendous forces, pushing or pulling against the frame of the truck. The robot devices 16 will be described fully in connection with the following figures.

Figure 4:
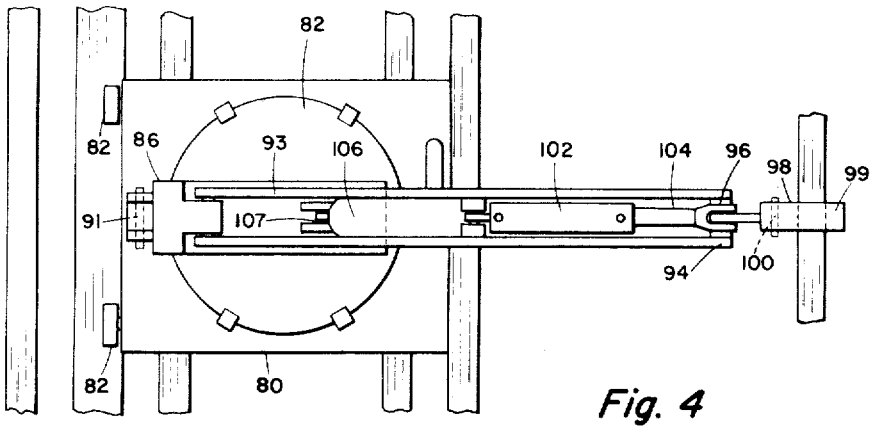
FIGS. 4 and 5 illustrate in two views details of the robot device or the hydraulic crane apparatus which is used to provide push and pull and lift forces against the truck frame.
Figure 5:
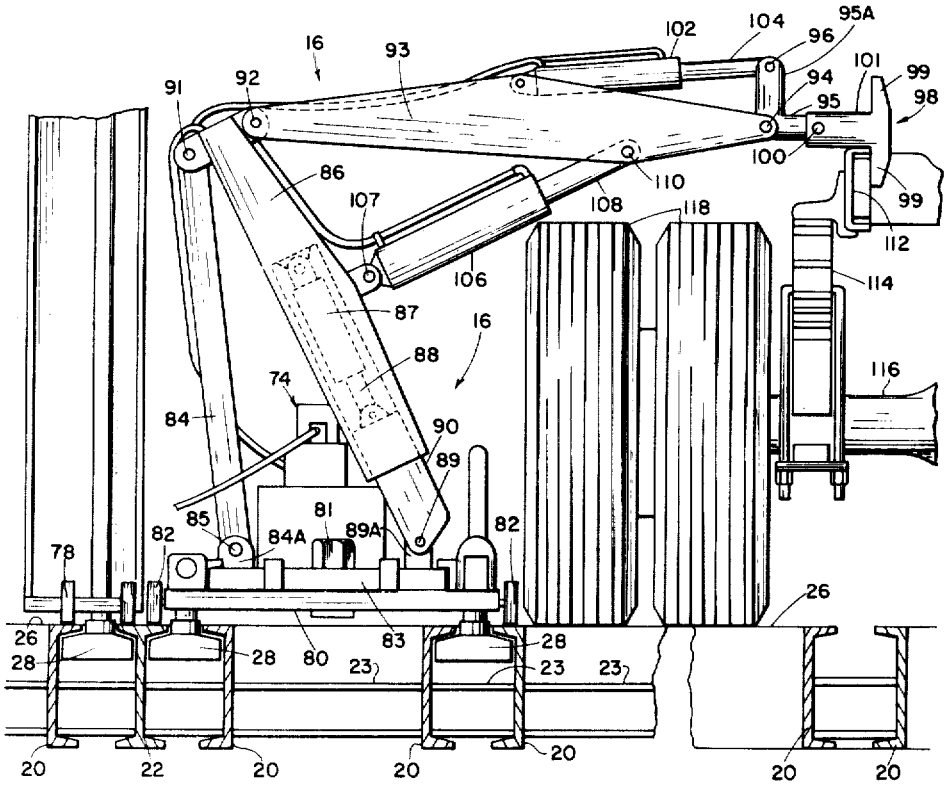

Referring now to FIGS. 4 and 5, there is shown in plan view and elevation, one of the robot devices indicated generally by the numeral 16. The robot device comprises a base plate 80, which may be a rectangular, or square, or triangular in shape, as in FIG. 6, for example. It has a plurality of rollers 82 which will be described in greater detail in FIGS. 8, 9, 10, and 11, which support the base 80 and run along the edge surfaces of the channels and/or I beams, which form the track framework in the floor. On top of the base 80 is a rotatable circular table 83 shown more clearly in FIGS. 6 and 7 which is supported on a large ball bearing 124 having an outer race 128 which is attached to the base 80 by means of screws 134. It has an inner race 126 which is attached by bolts 132 to the circular rotatable table 83 by means of cup spring washers 140 on top of the inner race and 142 on top of the circular table. The purpose of these spring washers will be fully described in later drawings. A central bolt 81 is positioned at the axis of rotation of the circular table to the base in case other points give way.

Mounted on the circular table 83 are a pair of tongues 84A, and another pair 89A, which serve to support pins 85 and 89, which permit rotation of an arm 84 and the hydraulic element 86. The arm 84 and the hydraulic element 86 are also hinged together by means of pin 91 at their other ends. Inside of the hydraulic element 86 is a hydraulic cylinder 87, shown in dashed line, a piston 88, which is connected to a cylindrical operating element 90. By providing hydraulic fluid under pressure to the cylinder 87, the piston 88 is pushed outwardly, the cylindrical element 90 is extended, and the top end of the arm 84 is moved backward, or to the left, exerting a pull on the hook element 99 by means of the arm 93, and so on.

Figure 6:
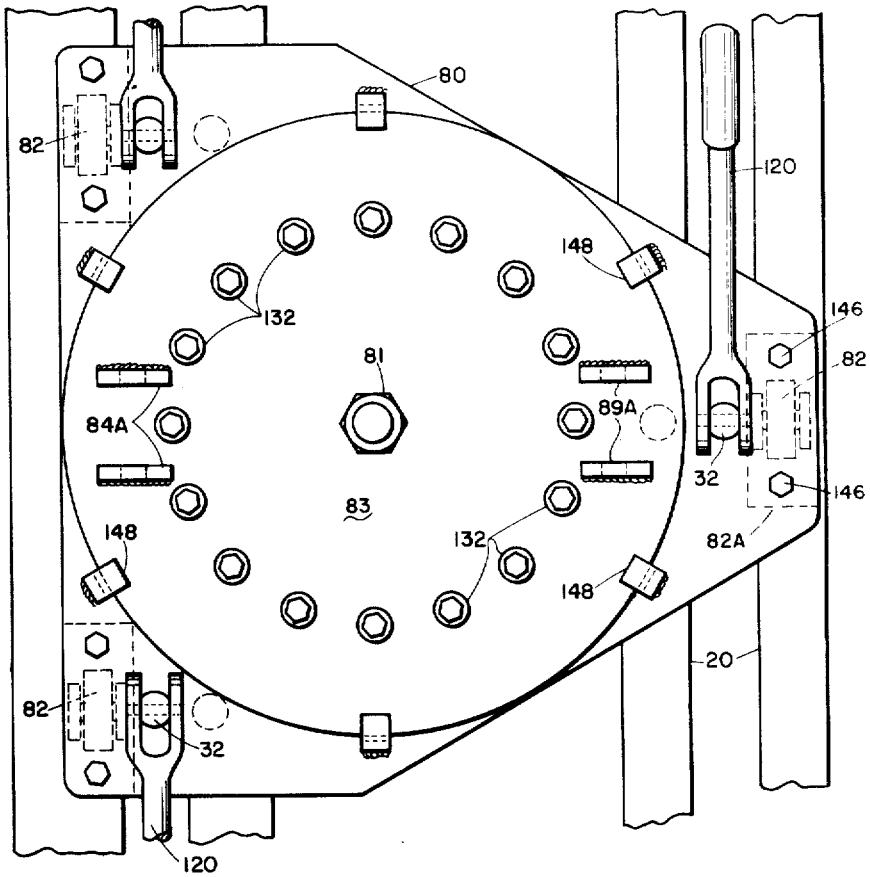
FIGS. 6, 7, 8, 9, 10, 11 and 12 provide additional details of the construction of the robot device.

In FIG. 6, there is shown in dashed line, the rollers 82 which are attached to the base plate 80 of the robot element 16. These are shown in greater detail in FIG. 7. The rollers are adapted to roll on the top surface 26 of the channels and I beams. The rollers 82 are supported on a plate 82A which is supported by two bolts 146 from the base plate 80. A spring washer 144 is provided between the plate 82A and 80 under each bolt 146, so that the plate 80 is supported by the spring in an upper position.

There is a clearance 136 between a downward projection 80A of the base plate 80, above the surface 26 of the channel. In other words, so long as there is no greater load on the base plate 80 than can be supported by the spring washers 144, the portion 80A is held out of contact with the channel surface 26, by the springs 144. A locking plate 28 is supported by a vertical shaft 32, which extends upwardly in the opening between the two channels 20, for example. The vertical shaft 32 passes upwardly through an opening in the base plate 80, and is supported by a pin 32A, which engages a lever or cam arm 120, which has a cam shaped portion 120A, as shown in FIGS. 8 and 9.

Figure 8:
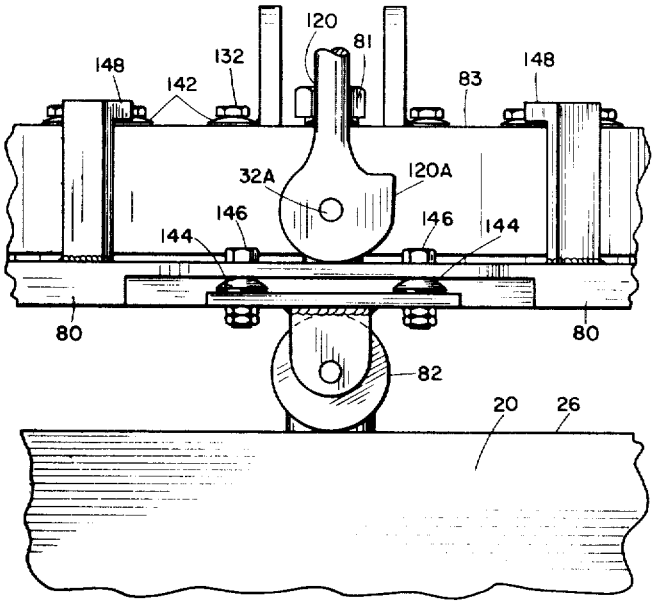
Figure 9:
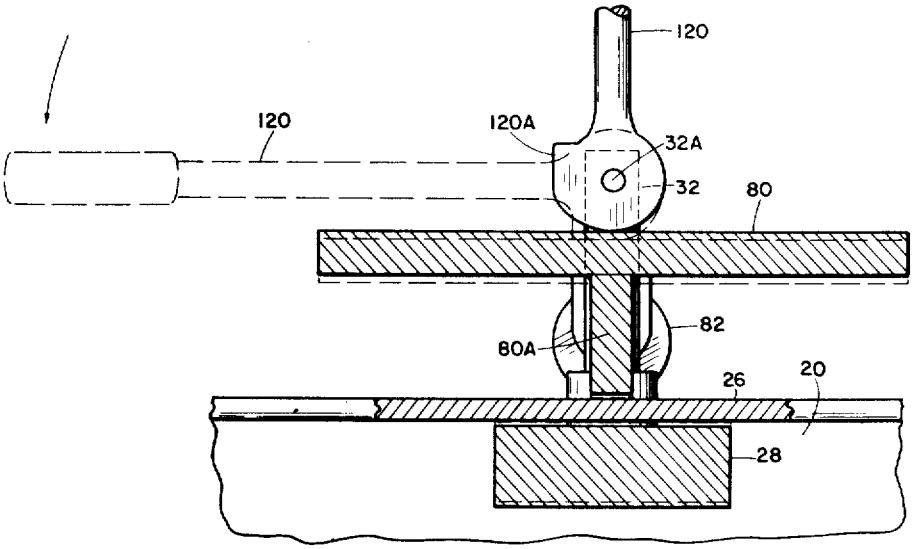

When the cam 120 is rotated from the position shown in FIG. 8 to the position shown in FIG. 9, the shaft 32 will be raised and the locking plate 28 will be brought upwardly into contact with the flanges of the channels 20. The cam is so designed that when the locking plate 28 is in contact with the flanges, further rotation of the arm 120 causes the base plate 80 to be pressed downwardly, compressing the spring washers 144, and permitting the base extensions 80A to be pressed downward into firm contact with the top surface 26 of the channel. When the arm 120 is in the horizontal position, the cam is locked, and the base plate 80 is rigidly attached to the channel structure, and will not move along the channel when a pull is exerted by the hydraulic system, which will be described in further detail.

Figure 7:
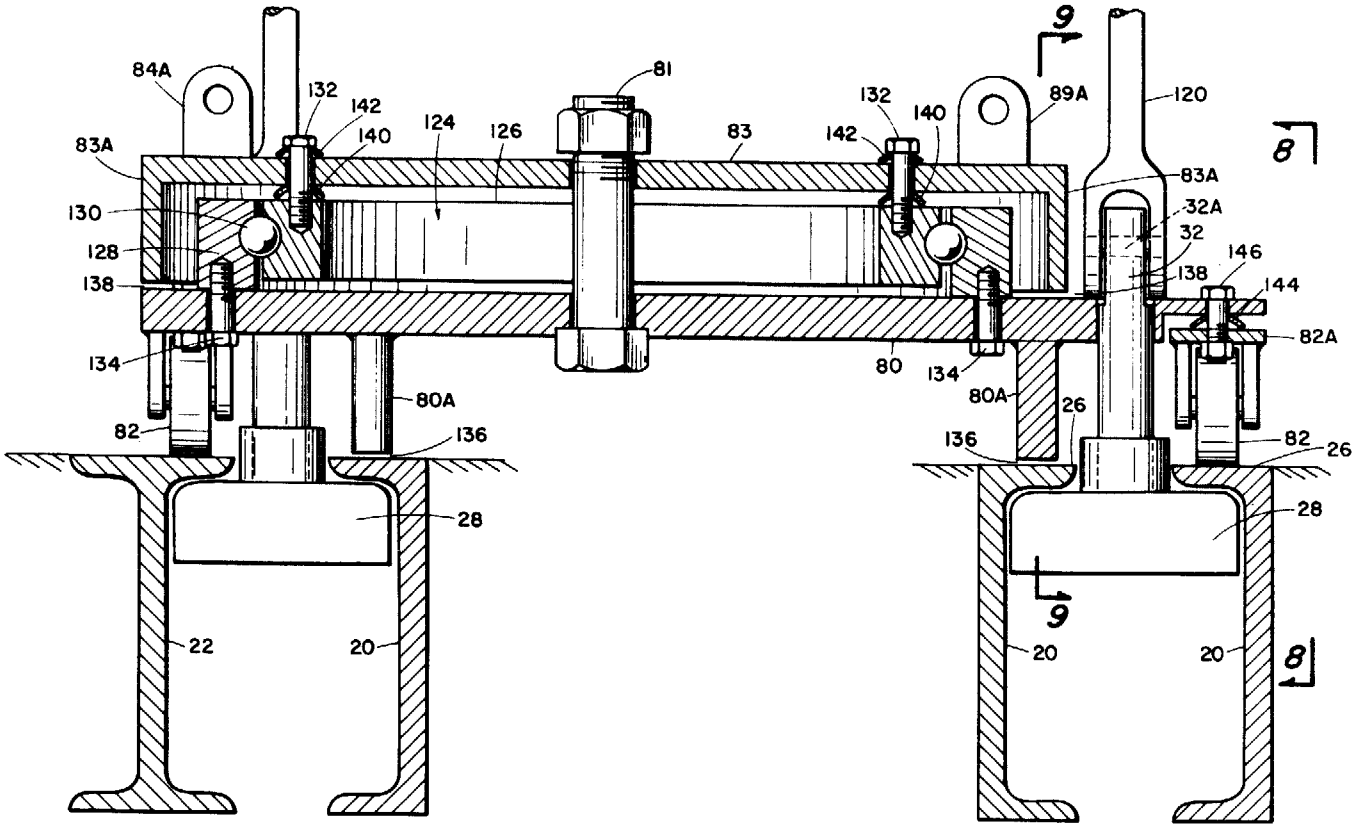

In summary, FIG. 7 illustrates the condition where the arms 120 are in an upper position and the base plate 80 is supported with its extensions 80A above the top surface 26 of the channels with a clearance 136, and the base is free to roll along the track on the rollers 82. This is shown also in FIG. 8 which is taken along the plane 8—8 of FIG. 7. and also shown in FIG. 9 which is a section taken along the plane 9—9 of FIG. 7.

Figure 10:
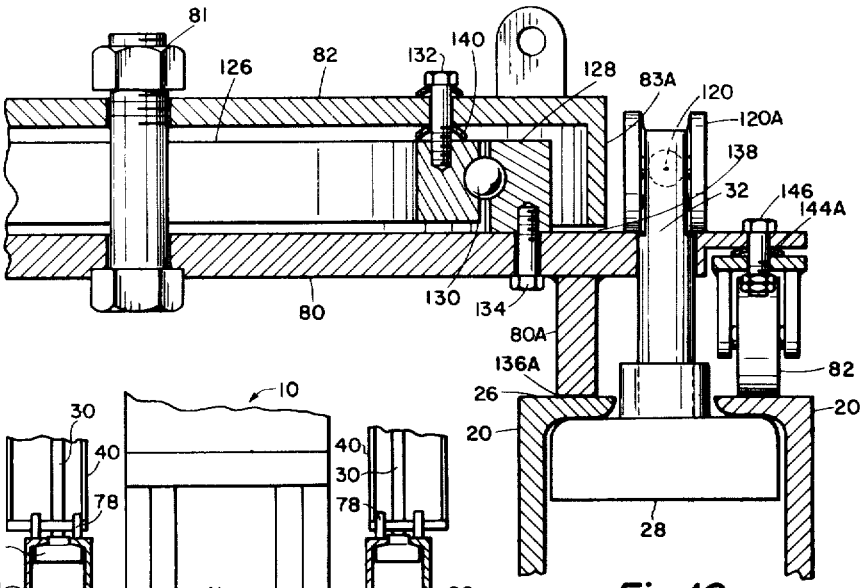

FIG. 10 illustrates the condition where the operating arm 120 is pushed to the dashed position of FIG. 9, and the cam then has lifted the locking plate 28 up into contact with the channel, and has caused the base plate 80 to move downward until the projections 80A are in contact with the top surface 26, and the clearance 136 has now changed to 136A, which is essentially zero, meaning that the projection 80A is in firm nonsliding contact with the surface 26. In this condition, the spring washer 144 is in the condition 144A, in which it has flattened out, permitting the plate 80 to move downwardly under the force of the cam 120A.

Referring back to FIG. 7, there is shown the circular table 83 which is supported on the ball bearing 124 which has its outer race 128 supported in contact with the base plate 80 by bolts 134. The inner race 126 is supported by means of bolts 132, with the spring washers 140 and 142 in position between the inner race and the under surface of the table 83, and above the table 83 under the head of the bolt 132. In this condition, the clearance 138 between the down hanging flange 83A of the rotating table 83, and the base plate 80, is such that the table 83 can rotate freely about the bearing 124. The spring washers 140 are similar to those previously described in connection with FIGS. 7, 8, 9 and 10 which support the base 80 from the plates 82A, which carry the rollers 82.

So long as the downward force on the rotating table 83 is less than the spring constant of the spring washers 140, then the table 83 is permitted to rotate freely in the bearing 130. This condition is shown in FIG. 10.

Figure 11:
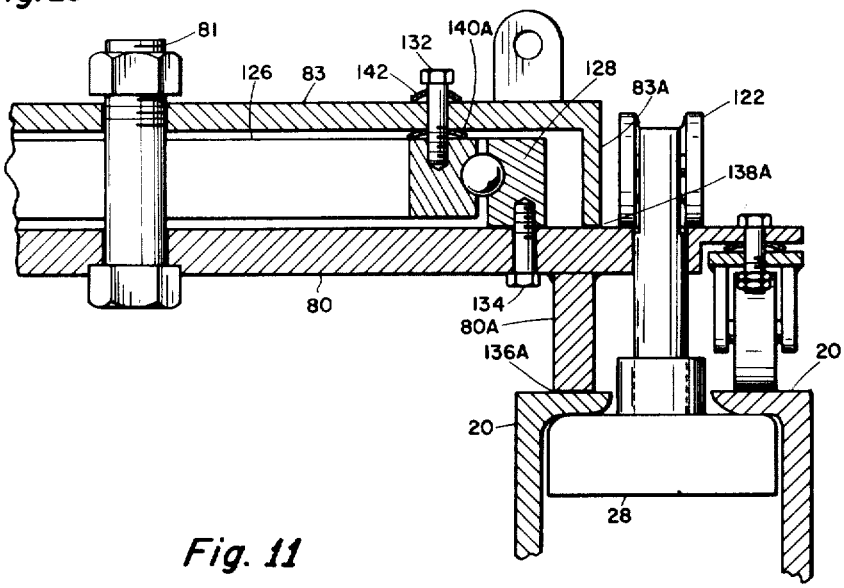

In FIG. 11, the condition is shown where there is sufficient downward force on the rotating table that the flange 83A has been forced downwardly into contact with the base plate 80, and the clearance 138A has been reduced to zero. In this condition, the inner spring washer 140A has now been flattened to permit the downward movement of the table 83, into contact at 138A with the base 80.

Figure 12:
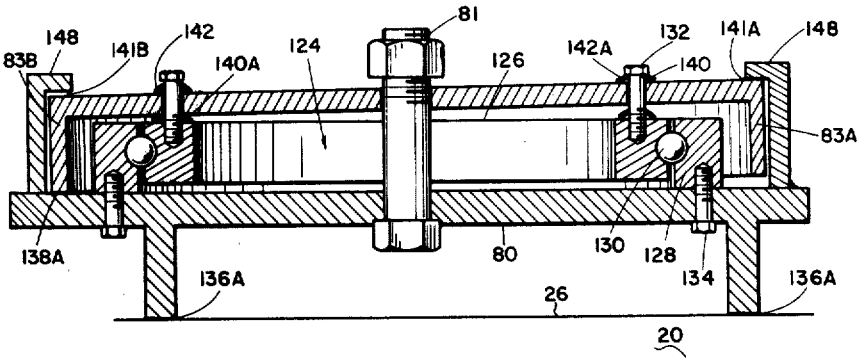

As will be explained further, the rotating table 83 carries the hydraulic mechanism which is adapted to push or pull against the frame of the truck. In so doing, there will be a lateral force which will cause the table 83 to tilt, whereby one edge of the flange 83A may be lifted as in FIG. 12 and the opposite edge 83B lowered. When the edge 83B moves downward into contact with the base plate 80, the opposite flange 83A is lifted, and in lifting, the upper spring washer 142A is compressed against the head of the bolt 132, and a clearance 141A between the top of the table 83 and one or more of the brackets 148, diminishes to zero. On the opposite side 141B, there is increased clearance 148B.

In other words, the rotating table which is normally supported with clearance 138 between the bottom of the flange 83A and the plate 80, and with clearance of 141 between the top of the table 83 and the brackets 148, which are welded to the base 80, so that the table can rotate freely in the bearing 124. Assume that the bearing can stand a total axial loading of X pounds of force. Therefore, the rotating table 83 can carry up to X pounds without injuring the bearing and can rotate freely in the bearing. However, if the vertical loading on top of the table 83 is greater than X pounds, the bearing must be protected. The way this is done, is to permit the rotating table 83 to be lowered under the downward force of its load, until the flange 83A or 83B is in contact with the top surface of the base plate 80. In order to do this, the spring washers 140 must be compressed to the condition 140A at the edge of the table where it moves downward, to contact the base, and conversely, the washer 142A at the lifted edge of the rotating table, is compressed. The spring constant of the washers must be such that in total they will be compressed when the force on the table is greater than X pounds and in this way the rotating table is permitted to vary in the angle of its plane from that of the bearing and to limit the force that may be placed on the bearing to avoid injury thereto.

Of course, if the loading on the rotating table is uniform in a vertical direction and greater than X, it will move downward until the full flange 82A is in contact with the base plate. In case of nonvertical loads, the table 83 will then tilt as shown on FIG. 12. Since the hydraulic loads will in general be much greater than X, the bearing 124 is protected and adequate strength is provided by the brackets 148, and ultimately by the bolt 81.

It is intended that this robot device will be useful as a movable hydraulic crane that can pick up a load and transport it along the track on the rollers 82 and swing it around at any desired angle by means of the rotating table 83. To do this, the load must be such that the loading on the rotating table is less than the value X that will cause the group of spring washers 140 and 144 to be compressed. As soon as they become compressed, then the rollers 82 which permit travel of the robot are blocked by the extensions 80A of the base, and the bearing 124 in the rotating table 83 is also locked by the compression of the springs 140A that permit contact between the rotating table flange 83A and the base. Therefore, so long as the load is less than a selected maximum, the robot device 16 acts as a movable hydraulic crane that can lift and rotate and move the load along the track.

When the robot is to be used for a pulling or pushing action at a selected angle, the device is then positioned along the track at a desired location and the base 80 is locked to the track by means of the levers 120 and cams 120A. The table is rotated to the desired azimuth, and the hydraulic force applied. Under the influence of the force, the rotating table 83 will be tilted until it is in contact with the base 80 and therefore there will be no further rotation of the table, or movement of the device along the track, and a pull or a push determined by the hydraulic operation of the robot 16 can be carried on.

Referring back to FIG. 5, the actuating arm 93 is hinged at one end to pin 92 on a tongue which is part of the hydraulic arm 86. The arm 93 carries at its opposite end a crank arm 95, 95A which is pivoted at the pin 94 through the end of the arm 93. One portion of the crank arm, 95A carries a pin 96 to which is attached a piston rod 140 which is part of a hydraulic cylinder 102. By controlling fluid into one end or the other of the cylinder 102, the piston 104 can be pulled in or pushed out thereby rotating the crank arm 95A about the pin 94.

Figure 13:
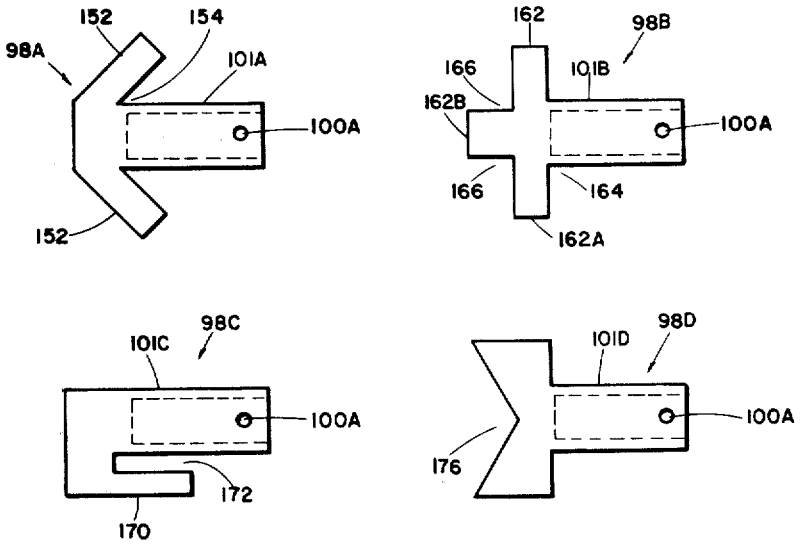
FIG. 13 illustrates a plurality of terminal units which are adapted to pull, push, and twist the frame of the vehicle.

The other arm 95 of the crank extends more or less along the direction of the arm 93. It is adapted to support one or another of the various types of fixtures 98. The fixture has an opening into which the arm 95 can be inserted and can be locked by means of a pin 100. The fixture 98 may be of any of a plurality of designs, such as shown in FIG. 13. In general, they will have one or more ears 99 which can be hooked on the inside of a portion of the frame 112 of the truck so that a pull outward on the frame can be exerted by the cylinder 87, by forcing the piston 88 outwardly, and lengthening the arm 86.

In FIG. 13, the fixture 101A has a pair of ears 152 which are at an angle less than 90° 154 which may better fit a particular situation than the ears of the fixture 98 of FIG. 5. In the case of fixture 98B, the ears 162, 162A and 162B are at right angles, providing corners 164 for pulling, or corners 166 for pushing. In each case, the shank 101B is adapted to fit over the arm 95, and to be locked by means of pin 100 through the opening 100A. Fixture 98C has an extension 170, providing a slot 172 between the extension 170 and the shank 101C. The purpose of the slot 172 is to grasp the inner edge of a U-shaped frame and to pull, and/or to exert an angular twist on the frame. The fourth embodiment of the fixture 98D illustrates a fixture which provides an angular opening 176 which can be pressed against a shaft or arm or frame, etc. to exert a push. Again, the shank portion 101D is adapted to fit over the arm 95, etc.

Referring back to FIG. 5, there is a cylinder 106 which is attached at one end by pin 107 to the hydraulic arm 86. The piston 108 is attached by pin 110 to the arm 93. By use of the cylinder 106, the arm 93 can be lifted at its outer end 94, or lowered, by extending or retracting the piston 108 in the cylinder 106.

The three cylinders 87, 106, and 102 are therefore seen to provide six modes of operation. These are an extension or contraction of the piston, in the cylinder, for each of the three cylinders. This provides a great flexibility in the positioning of the fixture 98 at a certain lateral dimension inwardly or outwardly of the truck, and at a selected vertical position up and down with respect to the floor 26, and at a specific angle of the arm 95 determined by the cylinder 102.

In the view of FIG. 5, it will be understood that using the cylinder 87 and extending the piston 88, the arm 93 will be moved to the left, exerting a force to the left on the frame 112. Conversely, by using a fixture such as that shown in FIG. 13, 98D or 98B, and pressing against the outside of the frame, and by retracting the piston 88 into the cylinder 87, the arm 93 will be moved to the right exerting a force to the right, or a push on the outside of the frame 112, and so on.

As a crane, to lift the outer end 95 of the arm 93, and with some piece of apparatus that must be lifted above the floor, this can be done by applying fluid pressure to the cylinder 106 to extend the piston 108 and therefore to rotate the arm 93 in a counterclockwise direction, thereby lifting the end fixture 98.

Figure 14:
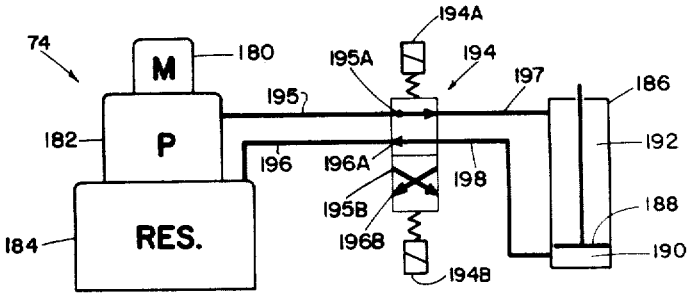
FIG. 14 illustrates the hydraulic mechanism of the invention.

Shown in FIG. 5, as part of the robot unit 16, is a structure indicated generally by the numeral 74. This is shown in greater detail in FIG. 14, and comprises a commercial device on the market which is a container 184 or reservoir for hydraulic fluid, a pump 182 and a drive motor 180 for the pump. There are two fluid lines, line 195, which carries the pressure output from the pump, and line 196 which returns the low pressure hydraulic fluid to the reservoir. A solenoid valve indicated generally by the numeral 194 is shown, which has two solenoid coils 194A and 194B. The position of the valve 194 is shown in the downward position, forced downwardly by the solenoid 194A. In this condition, high pressure conduit 195 goes to the terminal 195A, and in the lower position of the valve, connects to line or conduit 197 to the upper end of a cylinder 186. In the cylinder is a piston 188. The space above the piston is 192 and the space below the piston is 190.

With the valve in the downward position, the high pressure hydraulic fluid in conduit 195 goes to conduit 197 to the space 192, forcing the piston 188 to the bottom position, and forcing liquid out of the space 190 through lead 198 back to terminal 196A and line 196 to the reservoir.

When the lower solenoid 194B is operated, the valve is lifted so that the valve terminal 195B connects to the line 195 and the valve terminal 196B connects to line 196. Thus, the high pressure fluid in conduit 195 goes to terminal 195B and connects to line 198 to the space 190, forcing the piston 188 upwardly, and pushing fluid from space 192 through line 197 to terminal 196B and then through conduit 196 to the reservoir. The valve is normally centered by means of springs so that both leads 195 and 196 are blocked off until the valve is moved downward or upward, by operation of the solenoid 194A or 194B respectively.

In operation, the valve is opened momentarily in one direction or the other and a pulse of high pressure liquid goes into the proper chamber 192 or 190 of the cylinder 186. If the valve is held open longer, then more liquid flows and the piston travels a greater distance. If it has travelled too far, the valve is opened in the opposite direction and so on. Thus by choosing the length of time that the valve is operated either in a downward or an upward direction, the piston 188 can be precisely positioned along the cylinder.

On each robot 16, there is one such hydraulic unit 74. There are three valves similar to valve 194 each one going to a different one of the three cylinders 87, 106 and 102 on the robot structure. A control box with six electrical contacts is provided so that each of the three cylinders can be operated independently, and simultaneously, if desired. The two buttons corresponding to each cylinder calls for a movement of the piston inwardly or outwardly as the case may be.

What has been described is a complete, self-contained hydraulic crane or robot. It is adapted to run on rollers along a prepared track. It has a rotating table on which the hydraulic crane is mounted. The crane has six degrees of hydraulic freedom and can be provided with fixtures to pull or push, at any point against the frame of the truck. It can also be used as a movable crane to lift an article, transport it along the track and to rotate it to any azimuth.

An electrically controlled hydraulic apparatus is provided to produce the high pressure hydraulic liquid that is required for the operation of the device. When used as a pushing or pulling tool the robot is locked to the track by operating cam levers 120 as previously described. The rotating table 83 which carries with it a hydraulic mechanism, is rotated to the proper azimuth, hooked to the frame, and the proper cylinders supplied with high pressure fluid.

When a frame is to be straightened, there will be a number of points around the frame where forces must be applied either pushing or pulling. For example, a robot can be placed on one side of the truck pulling on the frame in a selected direction. Another robot can be placed on the opposite side of the truck pulling against the frame at another point in another direction and so on.

Also, as shown in FIG. 3, chains can be used and attached to the plates 28 in a track under the frame to provide a downward restraining force while the robot lifts the frame at another point, and so on. Thus, a combination of a plurality of the robot devices in connection with the tracks can be used to provide massive forces against the frame of the truck at a number of selected points, so as to straighten the frame as required.

Referring again to FIG. 3, it will be clear that the amount of force required to straighten the super structure, or body of the truck, are much smaller than those required for straightening the frame. This can be done by a cylinder 52 supported in the frame 50 having a piston 54 with the chain 55 and hook 56, pulling against the wall 15 of the body for example. Here again on the structure 50, which supports the cylinder 52 a hydraulic unit 74 is mounted to provide the hydraulic fluid with suitable control 76, which can be handled by the man working on the platform 62. If desired, a tubular compression member can be positioned over the piston rod 54 to press inwardly on the wall 15 as may be desired.

It will be clear, that if the truck 10 has no body, or if only the frame needs straightening, then the U frame 12 and its tracks are not required. Thus the plurality of robot units and their tracks provide one frame straightening apparatus, applicable to applying forces to a low structure.

The U frame 12, and its tracks comprise a second straightening, force-applying apparatus, adapted to apply forces to a tall structure.

Figure 15:
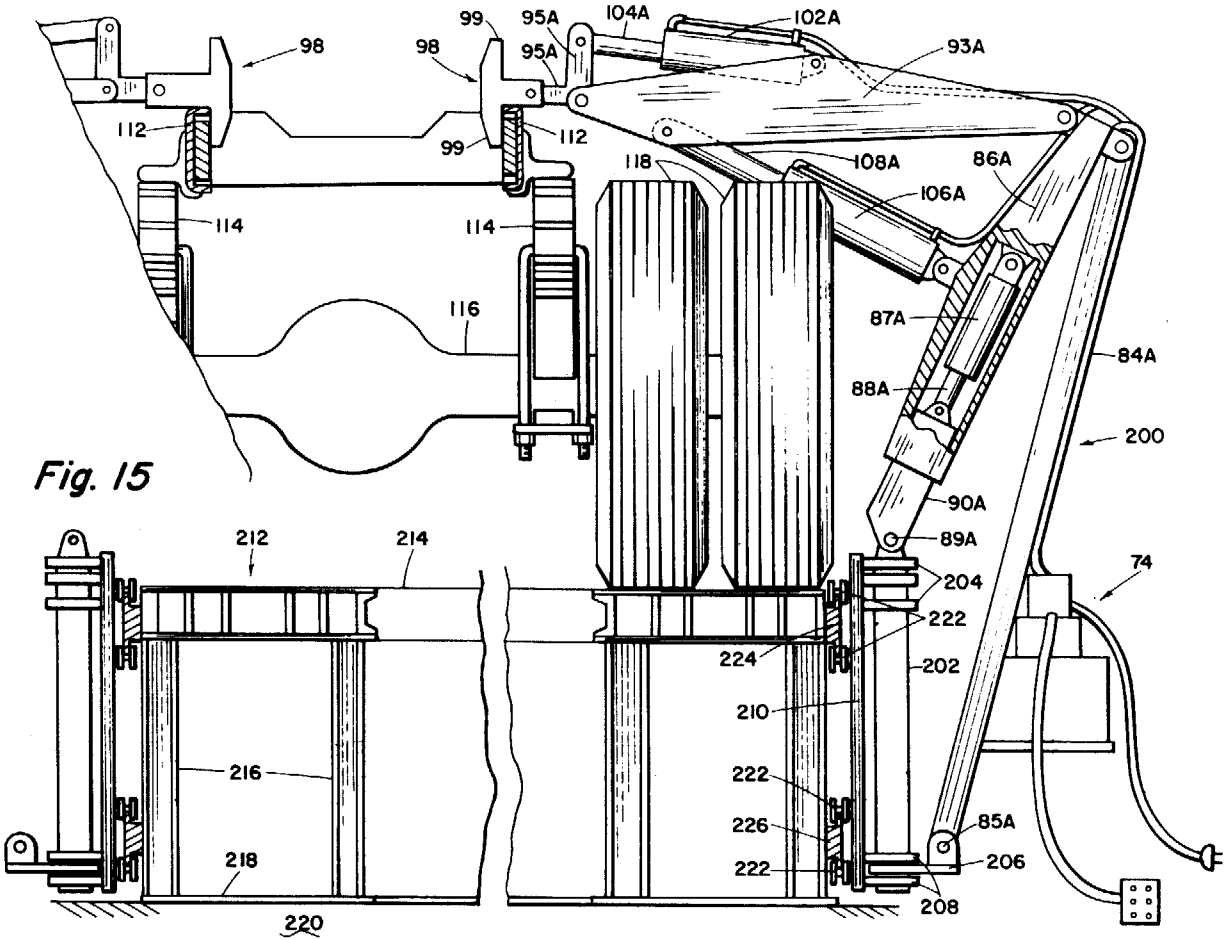
FIG. 15 illustrates a second embodiment of the invention in which the truck is mounted on a platform and the robot device is attached to tracks on the sides of the platform which support the truck.

Referring now to FIG. 15, there is shown another embodiment of a robot truck liner system, which involves an elevated platform indicated generally by the numeral 212, onto which a truck is driven by means of a ramp at one end (not shown but well known in the art). The platform 212 comprises a planar rectangular network of I beams, or channels 214 in the form of a rectangular platform somewhat wider than the truck, and somewhat longer than the truck. The top 214 of the platform 212 is supported on columns 216, with appropriate cross-bracing, and stands on a plate or framework 218, which, with adequate cross-bracing, provides a rigid unitary structure that can support the heaviest truck that will be serviced. The frame is also rigid enough so that the frame itself can be used to exert restraining or pushing forces, by setting into the frame vertical uprights, through appropriate openings in the framework, so that a push on the outside of the frame on one side of the truck can be compensated by the resisting push of the vertical support on the other side of the truck.

Such a framework as this, with the ability to receive vertical columns to restrain the movement of the frame, is fully illustrated in applicant's issued U.S. Pat. No. 3,888,100 and need not be further described at this time. The frame 212 is used to support the truck, and support for a plurality of robot devices 200 which are adapted to run longitudinally along tracks which are attached to a side of the supporting framework 212. Thus, opposing forces can be exerted on the frame of a truck by robot devices such as illustrated in FIG. 15 positioned on tracks on opposite sides of the framework 212, for example.

Although the robot device generally indicated by the numeral 200 is quite similar to that illustrated by numeral 16 in FIGS. 3, 4, and 5, there is a difference in that the base plate, such as 80 of FIGS. 4 and 5, which supports the hydraulic crane, is in a horizontal plane, supported on rollers which run on horizontal rails, while in the embodiment of FIG. 15, the base plate which supports the hydraulic crane is in a vertical plane, and is supported by horizontal rails attached to the sides of the platform. Rollers 222 are attached to the base plate 210, which have deep grooves 230, which are adapted to run on the edges 232 of the rails 224, 226 which are welded or otherwise attached to the frame or platform 212.

Again, as in the case of FIGS. 4 and 5, the hydraulic crane is supported in a rotary manner from the base plate. In FIG. 15, this is done by means of a vertical shaft 202 which is supported in bearings 204 and 208, which are adapted to provide thrust to support the weight of the crane and its load, while permitting rotary motion about the axis of the shaft 202.

Figure 16:
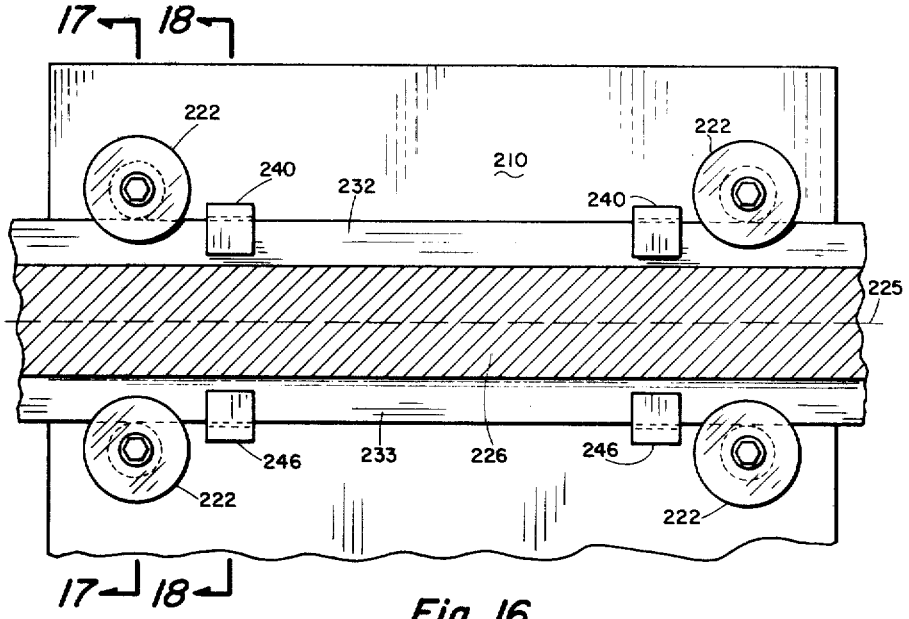
FIGS. 16, 17, 18 illustrate details of the embodiments of FIG. 15.
Figure 17:
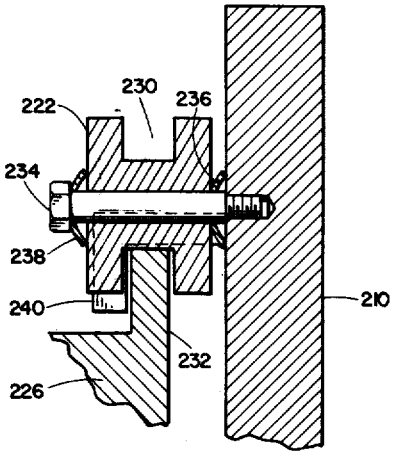
Figure 18:
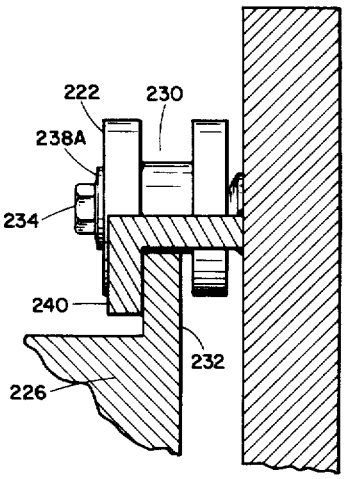

Referring now to FIGS. 16, 17, and 18, there are details of the base plate 210, the rollers 222 which run on the rails 224, 226, which have the rail edges 232, which are adapted to run in the circumferential notches 230 of the rollers. The opposing rollers 222 are attached to the base plate 210 by means of bolts 234, and with spring washers 236 and 238. The spring washers keep the rollers centered on the bolt and there is some play between the groove 230 in the rollers and the track 232. This permits the base plate 210 and the hydraulic crane to be rolled along the track 226 to any longitudinal point along the side of the truck.

There are a plurality of brackets 240, 246 welded to the back surface of the base plate 210, which overhang the rails 232 with some clearance as shown by the dashed line in FIG. 17. Thus, in normal running along the tracks without any hydraulic forces, the base plate 210 is free to move on the rollers and can easily be positioned at any longitudinal point.

When a load is applied to the truck by means of the hydraulic crane, there is a tilting, out of the vertical, of the base plate 210, and either the top clamps 240 or the bottom clamps 246 will be pulled laterally, and will press against the track 232 at the top or 233 at the bottom depending upon whether the crane is pulling or pushing at the time. However, the full torque, or rotary moment of the base plate, is carried by the brackets 240 and 246 and the strain is relieved from the rollers by compression of the spring washers 238A, for example, as shown in FIG. 18.

In FIG. 15, the base plate 210 is shown with two tracks 224, 226, with four edges 232, and four sets of rollers. It is clear that the track 226 of FIG. 16 can be cut along the line 225. The upper half will then serve for the track 224, and the bottom half for the track 226, with only two sets of rollers 222 and two sets of brackets 240, 246.

Referring back to FIG. 15, the hydraulic crane is quite similar to that shown in FIGS. 5, 6 and 7 comprising the hydraulic arm 86A, which corresponds to the arm 86, the arm 84A which corresponds to the arm 84, and the arm 93A which corresponds to the arm 93 of FIG. 5. The relative dimensions of the various arms are somewhat different in FIG. 15 and FIG. 5, but the operation is substantially the same as described for FIG. 5, and need not be repeated. Again, as in FIG. 5, the hydraulic motor, pump, and sump unit 74 is provided with corresponding electrical control switches and solenoid valves as previously described.

What has been described are two basic systems, one which uses a steel set of tracks embedded in the concrete floor, and the other comprises an upstanding steel platform, designed to support the truck in an elevated position, where the tracks are mounted on the sides of the platform instead of on the floor. In this second embodiment the entire platform can be preassembled and set up in an open area on a concrete pad, for example and work carried on immediately without any preparation of the site. As shown in U.S. Pat. No. 3,888,100, the robots on the tracks on the sides of the platform can be locked against movement above the track by means of pins or rods inserted into appropriate openings fabricated at spaced intervals along the tracks.

Each of the two basic systems employ a plurality of robots which run on longitudinal tracks. Each robot is adapted to roll longitudinally to any selected point and can be swivelled to any selected azimuth and has means for locking the position of the robot to prevent it from moving when making a pull, or a push, at any angle. When the robot is not being used for pushing or pulling, but simply for lifting, then the device can be used as a travelling crane, whether in the form of the floor mounted tracks, or on the platform mounted tracks.

A third type of straightening apparatus comprises the inverted U framework, with platforms and movable hydraulic cylinders, so that pushes and pulls can be carried out against the super structure of a truck body, as required. The U frame can be combined with either one of the two robot systems, or it can be used separately.

Figure 19:
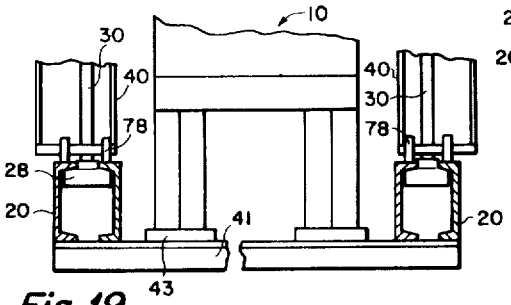
FIG. 19 is a partial sectional view of an additional embodiment of this invention.

Referring now to FIG. 19 there is shown schematically a shallow frame 41 which supports rails 20 on each side. The truck is adapted to run on the treads 43 on top of the shallow frame, to hold it down by the weight of the truck. The U frame shown in FIG. 3 is adapted to run on the tracks 20 and to be locked into the tracks by the plates 28, as previously described in connection with FIG. 3.

Thus, there can be a combination unit as shown in FIG. 3 of the tracks in the floor for both the robot and the U frame, or there can simply be tracks for the robots to work on the frame, and a separate set of tracks in the floor, or on a frame such as 41 of FIG. 19, so that the frame and/or the body can be worked on separately, at two different stations. The frame system of FIG. 19 can be used in conjunction with but separately from the embodiment of FIG. 15 and so on. Also by adding two sets of tracks to the shallow frame 41, as in FIGS. 1 and 2, the robot units of FIGS. 4, 5, 6 can be used with shallow frame 41, weighted down by the truck itself, instead of the tracks cemented into the floor.

Thus, tracks can be set into the floor, or can be attached to a shallow horizontal frame plus tracks, and used with the robot devices 16, or the tracks can be attached to a high platform with the tracks on the side of the high platform and robot units 200 used. The U frame can be used with the shallow frame 41 of FIG. 19, or the in-floor tracks of FIG. 3, either alone or in conjunction with robot units.

In FIGS. 1 and 2 I have shown some detail of the tracks on which the robots are guided, which surround the truck frame. While the ideal shape would be a substantially rectangular shape, that could support at least one robot on each of its linear sides, it might be convenient to have curved corners joining the straight sides so that the robots could easily be moved from side to side of the truck. However, this is not necessary if a means is provided for inserting on, and removing a robot from, a straight track. In that case there could be two, three or more straight tracks at 90° to each other and not connected to each other.

Thus, the shape and position of the tracks are open to choice, depending on the size and type of structures to be worked on. The tracks can be a single or plurality of straight or curved elements, which may be separate from each other, or joined in rectangular shape with square or round corners. Also, as shown in FIGS. 1 and 3 there can be straight tracks or other means for anchoring chains to the floor.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of the attached claim or claims, including the full range of equivalency to which each element thereof is entitled.

What is claimed:

1. Hydraulic crane, and apparatus for operating on a truck frame object by said hydraulic crane comprising:

(a) a frame means supporting at least one set of tracks which at least partially surround the central portion of the frame upon which said object can be positioned;

(b) at least one hydraulic crane adapted to run along said set of tracks, and to be positioned at a selected point along said tracks, said crane comprising;

(1) a base plate, adapted to roll along said tracks;

(2) a rotatable means, including a table means rotatably supported on said base plate;

(3) a first arm of fixed length pivotally attached at a first end to said rotatable means;

(4) a second arm formed of first and second portions, one end of each portion telescopically movable relative to the other, the other end of said first portion pivotally attached to said rotatable means and the other end of said second portion pivotally attached to said first arm at its second end, first hydraulic cylinder and piston means to extend or retract said second portion of said second arm means;

(5) a third arm attached by its first end near the junction of said first and second arms;

(6) second hydraulic cylinder and piston means connected between said second portion of said second arm means and said third arm, whereby the second end of said third arm can be raised or lowered by said second cylinder and piston means;

(7) means on the second end of said third arm to couple said third arm to said object; and (8) control means to operate all of said hydraulic means;

(c) means to lock said baseplate to said tracks;

(d) said rotatable table means including second roller means adapted to support said table for rotation under load of below a selected value of load, about a vertical axis, on said baseplate means; and wherein said rotatable table means includes spring means supporting said table means above said baseplate, such that when the load on said crane is greater than a selected value, said spring means will compress, and said rotatable table will be supported directly by said base plate means.

2. The hydraulic crane as in claim 1 in which said frame means is at least part of a horizontal rectangular frame inserted into and part of the cement floor, with said tracks at the level of said floor and horizontally disposed around the perimeter of said frame.

3. The hydraulic crane as in claim 1 including bracket means attached to said base plate means and overhanging said table means to limit the outward spacing between said table means and said base plate due to said spring means whereby when the load is greater than the strength of said springs, said brackets retain said table and the load is removed from said roller means.

4. The hydraulic crane as in claim 1 in which said spring means comprise spring washer means whereby the strength of said spring washers is set to be less than the strength of said bearing.

5. The hydraulic crane as in claim 1 in which said means to couple said second end of said third arm to a load comprises:

(a) a bell crank pivoted to said second end of said third arm;

(b) a first arm of said bell crank extends generally in the direction of said third arm, and is adapted to support one of a plurality of fixtures to connect with said object;

(c) the second arm of said bell crank directed substantially perpendicular to said first arm;

(d) hydraulic piston and cylinder means connected between said third arm and said second arm of said bell crank;

whereby application of pressure fluid to said cylinder will cause said bell crank to rotate, and said fixture to lock to said object.

6. The hydraulic crane as in claim 5 in which one of said fixtures comprises;

(a) a sleeve adapted to slip over said first arm of said bell crank;

(b) a bar substantially perpendicular to the axis of said sleeve at one end of said sleeve; and (c) means to lock said sleeve to said first arm of said bell crank.

7. The hydraulic crane as in claim 1 in which said second roller means comprises;

(j) ring bearing means having a vertical axis, said ring bearing means including an outer race and an inner race, one of said two races attached to said base plate means, the other race attached to said rotatable table means with spring means, whereby said rotatable table means, is adapted to freely rotate under crane loads less than the limits of said springs.

8. The hydraulic crane as in claim 1 in which said tracks are horizontally disposed, said base plate is horizontal and said rotatable table means has a vertical axis.

9. The hydraulic crane as in claim 1 in which said second roller means comprises an outer and an inner race, one of the two attached firmly to said base plate, the other attached to said rotatable table with spring means.

*10. The hydraulic crane of claim 1 further including:*

*a second set of tracks which at least partially surround the frame upon which said object can be positioned;*

*an inverted U-shaped second frame having a pair of spaced vertical columns forming each arm of said inverted U, and cross beams across the top of said two pairs of spaced columns, forming a rigid rectangular second frame;*

*roller means on the bottom of said four columns to roll said frame along said second tracks, and means to lock said columns to said second tracks;*

*a vertically movable platform, supportive of a person thereon, attached to said spaced columns between the columns and said object; and*

*means vertically movable upon said spaced columns for applying a force of selected magnitude and direction to the object.*

*11. The apparatus of claim 10 in which said platform includes means to fold said platform in a vertical plane substantially parallel to said spaced columns.*

*12. Apparatus for operating on the frame of a large wheeled object having a top and sides, said apparatus including;*

*means for positioning said wheeled object on a first frame, means to lock said object to said first frame; means to exert forces at selected points on said frame of said object; and track means on said first frame which extends at least along the two sides of said object, the improvement comprising:*

*means to exert forces of selected magnitude at selected points on the body of said object, comprising, an inverted U-shaped second frame, including;*

*(a) a pair of spaced vertical columns forming each arm of said inverted U, and cross beams across the tops of said two pairs of spaced columns, forming a rigid rectangular second frame that surrounds the top and sides of said object;*

*(b) roller means on the bottom of said four columns to roll said frame along said track means, and means to lock said columns to said track means;*

*(c) a vertically movable platform, supportive of a person thereon, attached to said spaced columns between the columns and said object; and*

*(d) a vertically movable platform, supportive of a person thereon, attached to said spaced columns between the columns and said object;*

*means vertically movable upon said spaced columns for applying a force of selected magnitude and direction to the object.*

* * * * *